(12) United States Patent
Hall et al.

(10) Patent No.: US 7,455,117 B1
(45) Date of Patent: Nov. 25, 2008

(54) DOWNHOLE WINDING TOOL

(76) Inventors: David R. Hall, 2185 S. Larsen Pkwy., Provo, UT (US) 84606; John Fernandez, 2185 S. Larsen Pkwy., Provo, UT (US) 84606

( * ) Notice: Subject to any disclaimer, the term of this patent is extended or adjusted under 35 U.S.C. 154(b) by 0 days.

(21) Appl. No.: 11/859,248

(22) Filed: Sep. 21, 2007

Related U.S. Application Data (63) Continuation-in-part of application No. 11/828,848, filed on Jul. 26, 2007.

(51) Int. Cl.
*E21B 33/10* (2006.01)
(52) U.S. Cl. .................. 166/380; 405/184.2; 405/156; 166/378
(58) Field of Classification Search ............... 166/380, 166/378, 385, 231, 242.1; 405/154.1, 156, 405/184.2; 242/441.2, 441.4, 471
See application file for complete search history.

(56) References Cited

U.S. PATENT DOCUMENTS

| | | | |
|---|---|---|---|
| 341,327 A | 5/1886 | Pay | |
| 2,143,072 A | 1/1939 | Johnson | |
| 3,364,993 A | 1/1968 | Skipper | |
| 4,544,041 A | 10/1985 | Rinaldi | |
| 4,865,127 A | 9/1989 | Koster | |
| 4,913,758 A | 4/1990 | Koster | |
| 4,971,152 A | 11/1990 | Koster | |
| 4,995,929 A * | 2/1991 | Menzel | 156/187 |
| 5,046,558 A * | 9/1991 | Koster | 166/243 |
| 5,101,863 A | 4/1992 | Fujii | |
| 5,271,472 A | 12/1993 | Leturno | |
| 5,454,419 A | 10/1995 | Vloedman | |
| 5,799,701 A | 9/1998 | Kitahashi | |
| 6,234,226 B1 * | 5/2001 | Kitahashi et al. | 156/391 |
| 6,250,385 B1 | 6/2001 | Montaron | |
| 6,637,092 B1 | 10/2003 | Menzel | |
| 6,640,903 B1 | 11/2003 | Cook | |
| 6,675,901 B2 | 1/2004 | Johnson | |
| 6,679,334 B2 | 1/2004 | Johnson | |
| 6,705,395 B2 | 3/2004 | Cook | |
| 6,710,600 B1 * | 3/2004 | Kopecki et al. | 324/338 |
| 6,725,919 B2 | 4/2004 | Cook | |
| 7,048,067 B1 | 5/2006 | Cook | |
| 7,134,495 B2 | 11/2006 | Vloedman | |

* cited by examiner

*Primary Examiner*—Jennifer H Gay
*Assistant Examiner*—Daniel P Stephenson
(74) *Attorney, Agent, or Firm*—Tyson J. Wilde (57) ABSTRACT

In one aspect of the invention a downhole winding tool adapted to dispense a lining material in a borehole comprises a lining material. The winding tool also has entry and exit seals that are adapted to permit the movement of the lining material through the winding tool. The entry and exit seals restrict formation pressure and contaminants from entering the winding tool.

20 Claims, 9 Drawing Sheets

180
DOWNHOLE WINDING TOOL

CROSS REFERENCE TO RELATED APPLICATIONS

This application is a continuation-in-part of U.S. patent application Ser. No. 11/828,848, which was filed on Jul. 26, 2007 and is herein incorporated by reference for all that it discloses.

BACKGROUND OF THE INVENTION

This invention relates to downhole drilling, specifically in relation to oil, gas and geothermal drilling. More specifically this invention relates to constructing a tubular structure in a well bore during the drilling of a well bore.

Well casings and liners may be used to separate the annulus of a well bore from fluid communication with the surrounding formation. Well bore isolation may be advantageous both in the interests of protecting the well bore from infiltration by water or chemical compounds in the surrounding formation, and in protecting the subterranean region surrounding the well bore from infiltration with drilling materials or environmental hazards. Various methods of lining well bores are known in the art, many of which include conveying a tubular structure downhole and securing it to the well bore wall. Methods or systems for casing or lining well bores are disclosed in U.S. Pat. Nos. 4,544,041; 5,271,472; 5,454,419; 6,640,903; 6,725,919; 7,048,067; and 7,134,495, each of which is incorporated by reference for all that it contains.

Methods or systems for using a wound strip to form a tubular structure are disclosed in U.S. Pat. Nos. 4,913,758; 4,971,152; 6,637,092; 5,799,701; and 4,995,926; each of which is hereby incorporated by reference for all that it contains.

U.S. Pat. No. 6,675,901 to Johnson et al, which is hereby incorporated by reference for all that it contains, discloses a system that is useable in a subterranean well that includes a tubular structure that is formed from a spirally wound strip, and the tubular structure is provided downhole in the subterranean well.

U.S. Pat. No. 6,679,334 to Johnson et al, which is hereby incorporated by reference for all that it contains, discloses a system that is useable in a subterranean well that includes conveying an elongated strip from a surface of the well downhole into the well; and spirally wrapping the strip to form a tubular structure in the well.

BRIEF SUMMARY OF THE INVENTION

In one aspect of the invention a downhole winding tool adapted to dispense a lining material 111 in a borehole comprises a lining material 111. The winding tool also has entry and exit seals that are adapted to permit the movement of the lining material 111 through the winding tool. The entry and exit seals restrict contaminants from entering the winding tool. The winding tool may comprise at least one roller, pulley, spool, deflection plate, deflection piston, motor, cam shaft, magnet, or combinations thereof.

The winding tool may support a borehole wall by directing the lining material 111 against the wall. The directed lining material 111 may form a tubular structure that comprises a continuous length exceeding one standard drill pipe length. In some embodiments the directed lining material 111 may form a tubular structure that is a well-casing, a patch, a liner, or combinations thereof. The lining material 111 may be selected from the group consisting of steel 1095 steel, spring steel, a nickel alloy, aluminum, plastic, polymers, and combinations thereof. The lining material 111 may extend from a driving mechanism disposed proximate a surface opening of a borehole to the winding tool.

The winding tool may comprise at least one guide block disposed within an outer diameter of a downhole tool string component. The guide block may comprise a lining material 111 entry flow path and a lining material 111 exit flow path. In some embodiments the entry and exit flow path comprise an intersection angle of between 65 and 115 degrees. The guide block may comprise a flow path that rotates the lining material 111 axially by substantially 180 degrees.

At least one of the entry and exit seals may be a pressure actuated compound seal. At least one of the entry and exit seals may comprise at least two roller seals. The roller seals may comprise an elastomeric material disposed along a contact surface of the roller seals. The roller seals may be tension control rollers.

Each of the entry and exit seals may comprise an inner slit through which the lining material 111 may pass respectively into and out of the winding tool. The inner slit of at least one of the entry and exit seals may be adapted to close around the lining material 111 when pressure external to the winding tool increases. A central bore may comprise at least one deflection plate adapted to direct the lining material 111 into the inner slit. The central bore may comprise at least one deflection element adapted to direct drilling mud away from the entry seal. In some embodiments of the invention, the winding tool may comprise a flattening mechanism adapted to form the lining material 111 into a substantially flat strip.

DETAILED DESCRIPTION OF THE INVENTION AND THE PREFERRED EMBODIMENT

Figure 1:
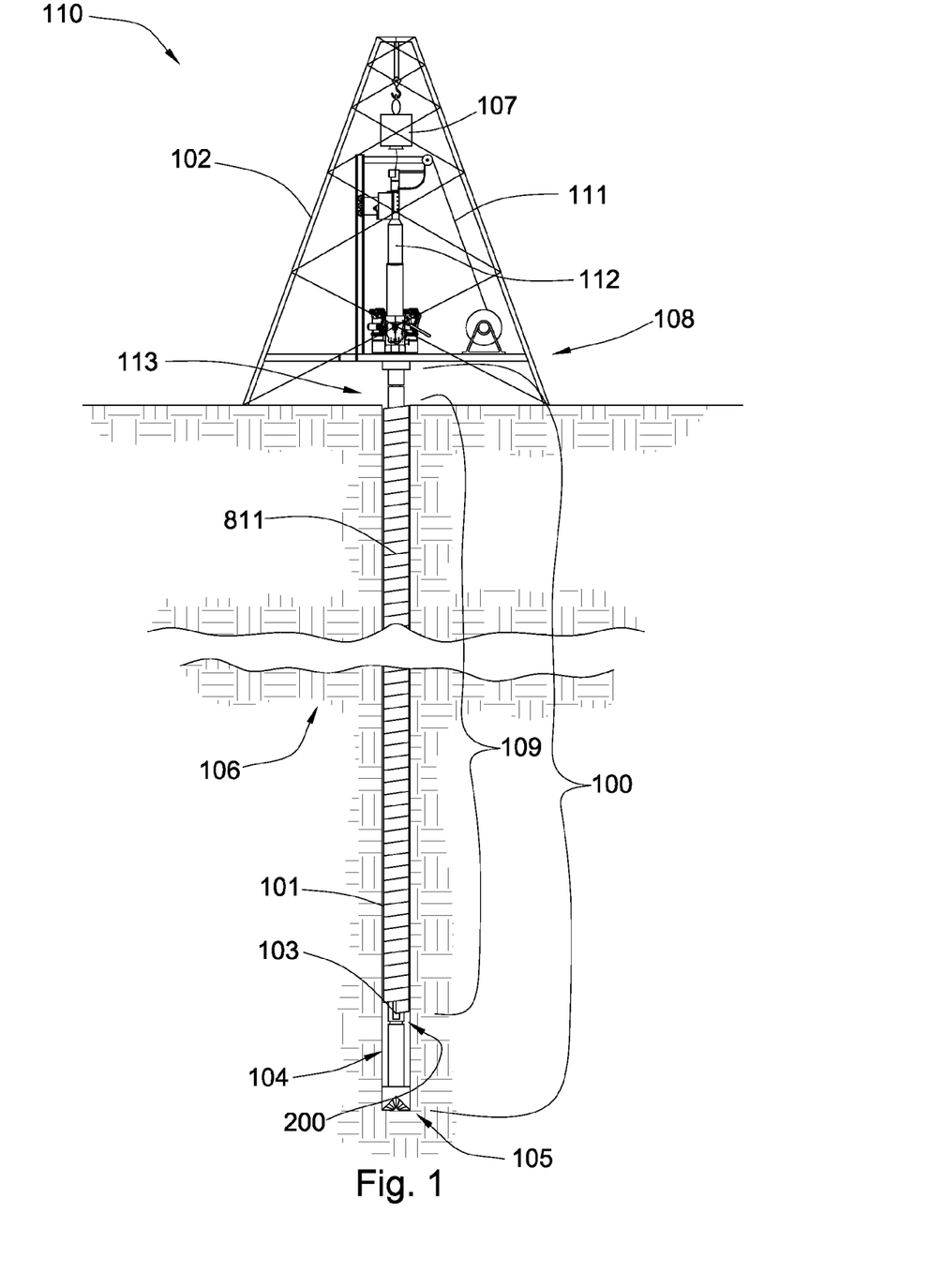
FIG. 1 is a cross-sectional diagram of an embodiment of a drill string suspended in a bore hole.

FIG. 1 is a cross-sectional diagram of an embodiment of a tool string 100 suspended in a well bore by a derrick 102. The well bore may also be known as a borehole. A borehole wall 101 may be a surface of a formation 106 exposed within the borehole. The tool string 100 may comprise a plurality of tool string components 103. One of the downhole tool string components 103 may be a bottom-hole assembly (BHA) 104. The BHA 104 is located at the bottom of the borehole and comprises a drill bit 105. As the drill bit 105 rotates downhole the tool string 100 advances farther into the earth lengthening the borehole. In such an embodiment the tool string 100 is a drill string. As the tool string 100 advances further into the earth additional tool string components 103 may be added to the tool string 100. The tool string 100 may penetrate soft or hard subterranean formations 106.

The bottom-hole assembly 104 and/or downhole components may comprise data acquisition devices which may gather data. The data may be sent to the surface via a transmission system to a data swivel 107. The data swivel 107 may send the data to surface equipment. Further, the surface equipment may send data and/or power to downhole tools and/or the bottom-hole assembly 104. U.S. Pat. No. 6,670,880 which is herein incorporated by reference for all that it contains, discloses a telemetry system that may be compatible with the present invention; however, other forms of telemetry may also be compatible such as systems that include mud pulse systems, electromagnetic waves, radio waves, and/or short hop. In some embodiments, no telemetry system is incorporated into the tool string. Mud pulse, short hop, or EM telemetry systems may also be used with the present invention.

A mechanical system 110 for forming a tubular structure downhole within well bore may comprise a surface rig 108, which may be connected to the derrick 102. A lining material 111 may be dispensed in the borehole by a downhole dispenser. The downhole dispenser may be a winding tool 200. The winding tool 200 may support the borehole wall 101 by directing a lining material 111 against the wall 101. A tubular structure 811 may be formed by spirally winding the lining material 111 in a helical pattern as the material 111 is extruded from the winding tool 200. The lining material 111 may be a resilient, continuous strip. The lining material 11 may be selected from the group consisting of steel, 1095 steel, spring steel, nickel alloys, aluminum, plastics, polymers, and combinations thereof. In the present embodiment the tubular structure 811 is being formed while the tool string is continuing to drill the well bore. The tubular structure 811 may comprise a continuous length 109 exceeding one standard drill pipe length. In some embodiments of the invention the tubular structure 811 may be a well casing, a patch, a liner, or combinations thereof. The winding tool 200 may be powered by a downhole mud motor, or by a driving mechanism 112 disposed proximate the surface rig 108. The driving mechanism may be a top drive. In some embodiments the lining material 111 may extend from the driving mechanism 112 to the winding tool 200. The surface rig 108 may be situated proximate a surface opening 113 of the borehole.

Figure 2:
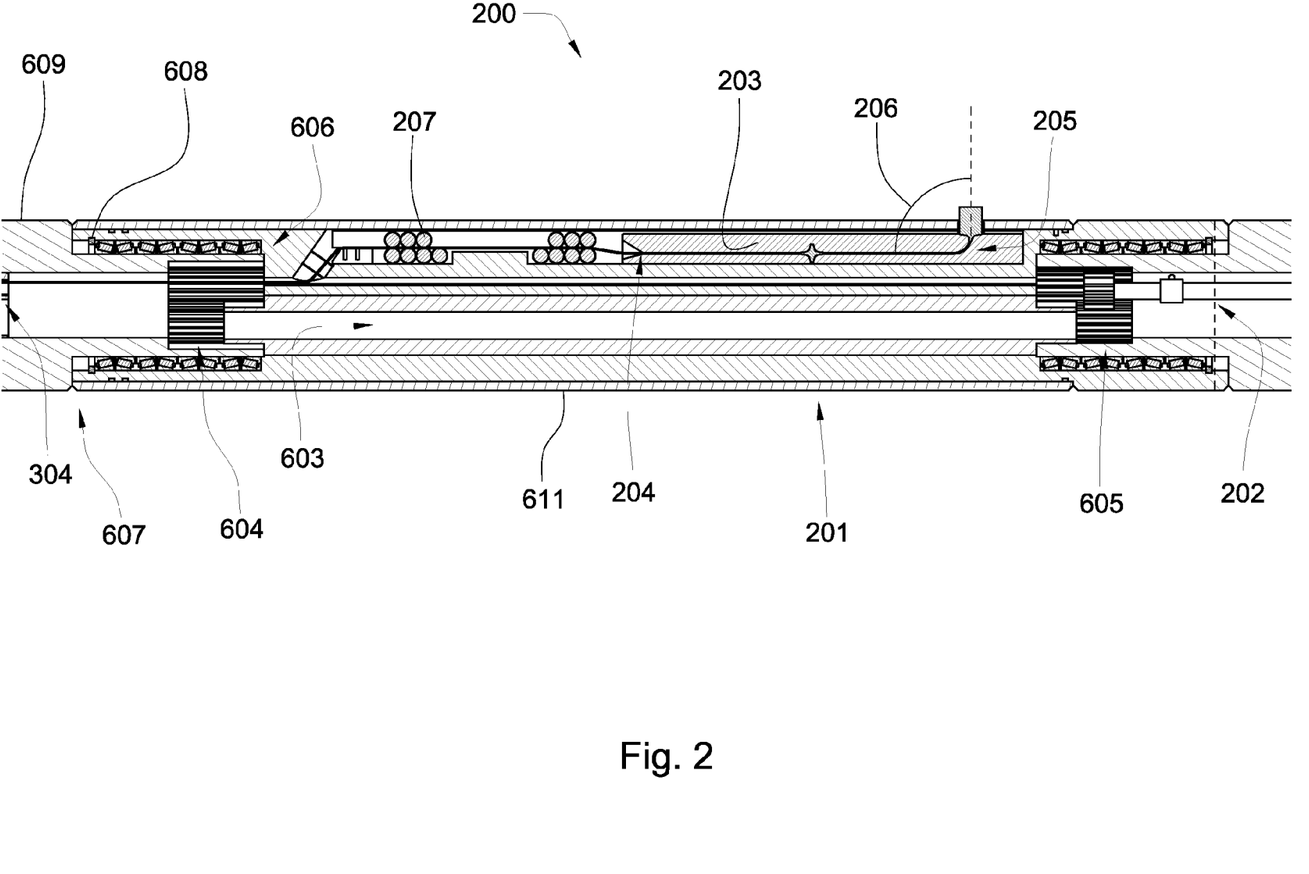
FIG. 2 is a cross-sectional diagram of an embodiment of a winding tool disposed within a downhole tool component.

Referring to FIG. 2, a cross-sectional diagram of a winding tool 200 is disclosed as part of a tool string 100. In the present embodiment winding tool 200 is disposed within a downhole component 201 of the tool string 100. Winding tool 200 comprises a sleeve 611 that substantially excludes drilling mud from the tool 200 from outside of the tool string 100. The tool string 100 comprises a central bore 304 through which drilling mud (not shown) may travel toward the drill bit 105. The drilling mud may be extruded from the tool string 100 at or near the drill bit and pass into an annular space between the tool string 100 and the formation 106. The mud may carry drilling debris or mud pulse signals towards the surface. Downhole component 201 also comprises a central bore 603 that connects a portion of central bore 304 downhole of the tool 200 with a portion of the bore 304 located above the tool 200. Central bore 603 comprises upper and lower splines 604, 605 that cause it to rotate axially with the tool string 100. In some embodiments of the invention the winding tool 200 may rotate axially independent of the tool string 100. A bearing stack 606 may be disposed proximate a component junction 607 and may facilitate the axial rotation of the winding tool 200 with respect to the rest of the tool string 100. The bearing stack 606 may also facilitate engagement and disengagement of the winding tool 200 with the rest of the tool string 100. A lock ring 608 may be disposed proximate the component junction 607. The lock ring 608 may facilitate engagement and disengagement of the winding tool 200 and an adjacent tool string component 609.

Also disclosed in FIG. 2, winding tool 200 comprises a guide block 203 disposed within an outer diameter 202 of downhole component 201. Guide block 203 comprises a lining material entry flow path 204 and a lining material exit flow path 205. The entry and exit flow path comprise an intersection angle 206. In the present embodiment intersection angle 206 is approximately 90 degrees. In some embodiments intersection angle 206 may be between 65 and 115 degrees. A plurality of strip rollers 207 may be disposed in the downhole component 201 and may pull the lining material 111 into and through the winding tool 200.

Figure 3:
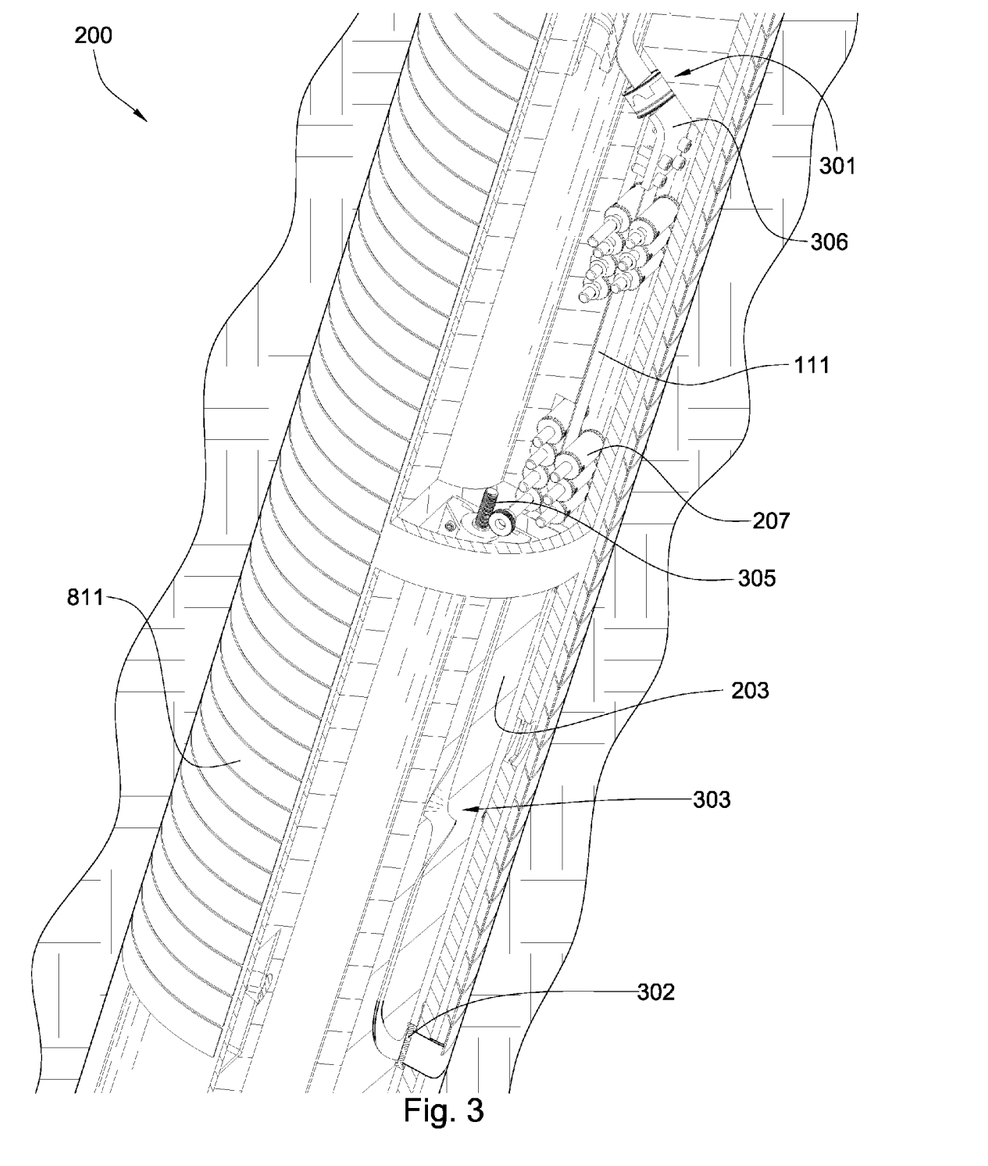
FIG. 3 is a cross-sectional diagram of another embodiment of a winding tool disposed within a downhole tool string.

Referring now to FIG. 3, winding tool 200 comprises entry and exit seals 301, 302 disposed on opposite ends of the tool 200. Each seal is adapted to permit movement of the lining material 111 through the winding tool while restricting contaminants from entering the winding tool 200. Contaminants may include drilling mud and other substances. The lining material may pass through an entry seal 301 as it enters the winding tool 200 in order to isolate the winding tool 200 from the pressure and drilling mud in the central bore 304. At least one of the entry and exit seals 301, 302 is a pressure actuated seal. Rollers 207 may feed the lining material 111 into guide block 203. In the present embodiment guide block 203 comprises a twisted flow path 303 that rotates the lining material 111 axially by substantially 180 degrees in preparation for dispensing the material 111 from the tool 200. In some embodiments of the invention rollers 207 may be used to direct the lining material 111 from the central bore 304 into the annulus of the borehole. Rollers 207 may be threadingly engaged with a connection spline 305. Connection spline 305 may rotate axially as a result of tool string rotation or as a result of a downhole motor. Downhole motors may include mud motors, electric motors, or combinations thereof. One or more deflection plates 306 may guide the lining material 111 into the rollers 207. The winding tool 200 may comprise at least one roller 207, pulley, spool, deflection plate, deflection piston, motor, cam shaft, magnet, or combinations thereof. Before the lining material 111 leaves the winding tool 200 it passes through an exit seal 302. Exit seal 302 may isolate the winding tool 200 from the pressure and drilling mud in the annulus of the borehole.

Figure 4:
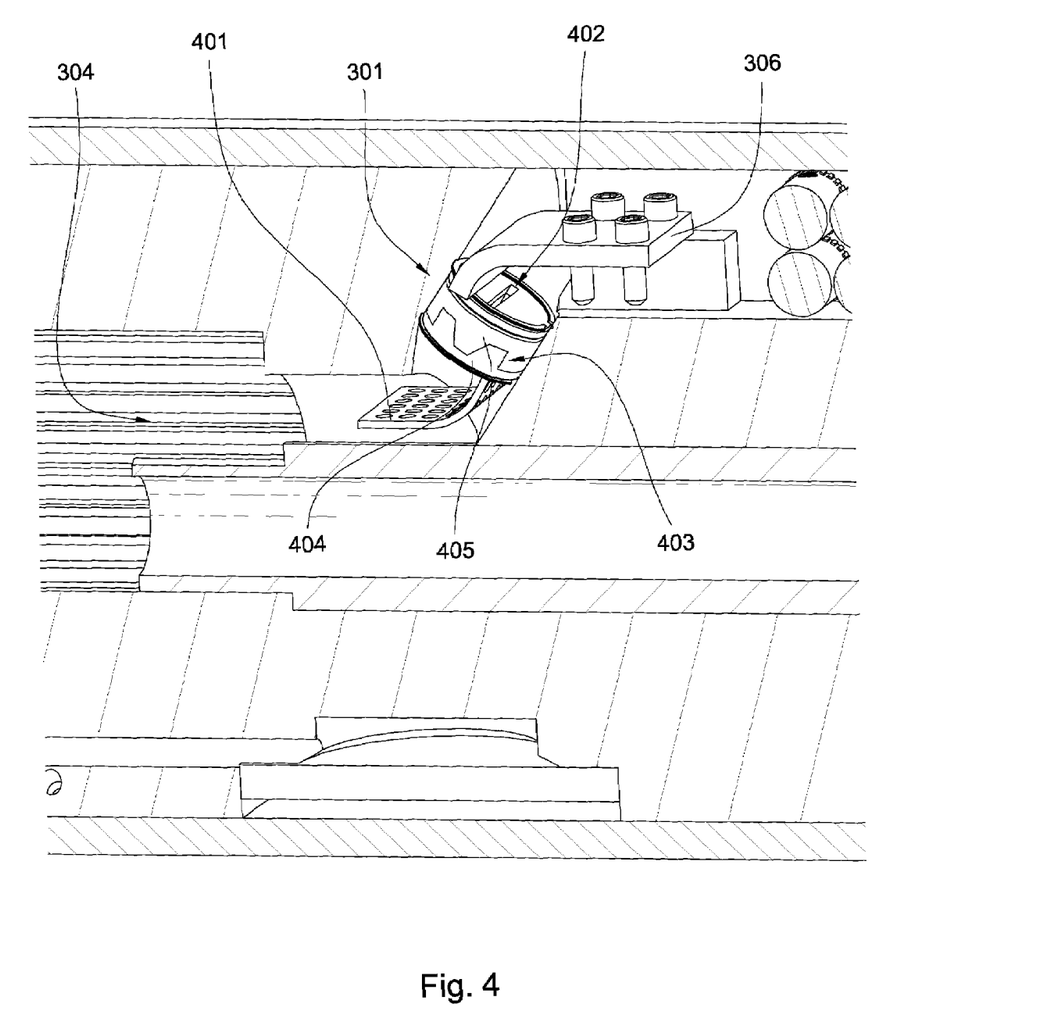
FIG. 4 is a cross-sectional diagram of an embodiment of a winding tool comprising an entry seal.

FIG. 4 discloses a close-up view of an entry seal 301. A first deflection plate 401 is adapted to direct the lining material into an inner slit 402 of the entry seal 301. The lining material 111 may pass into the winding tool 200 through inner slit 402. Entry seal 301 comprises a wedged shaped intersection 403 between first and second seal components 404, 405. When pressure inside the central bore 304 is high, the first seal component 404 may press harder against the second component 405 and causes inner slit 402 to close more tightly around the lining material 111. This may prevent sudden pressure increases within the central bore 304 from breaching the entry seal 301. Although the present embodiment discloses this feature on an entry seal 301, an exit seal 302 may also possess this property. In some embodiments, inner slit 402 may comprise an elastomeric material that contacts the lining material 111. The elastomeric material may wipe the lining material 111 as it enters the winding tool 200 and may thereby remove drilling cake or drilling mud or other contaminates.

Figure 5:
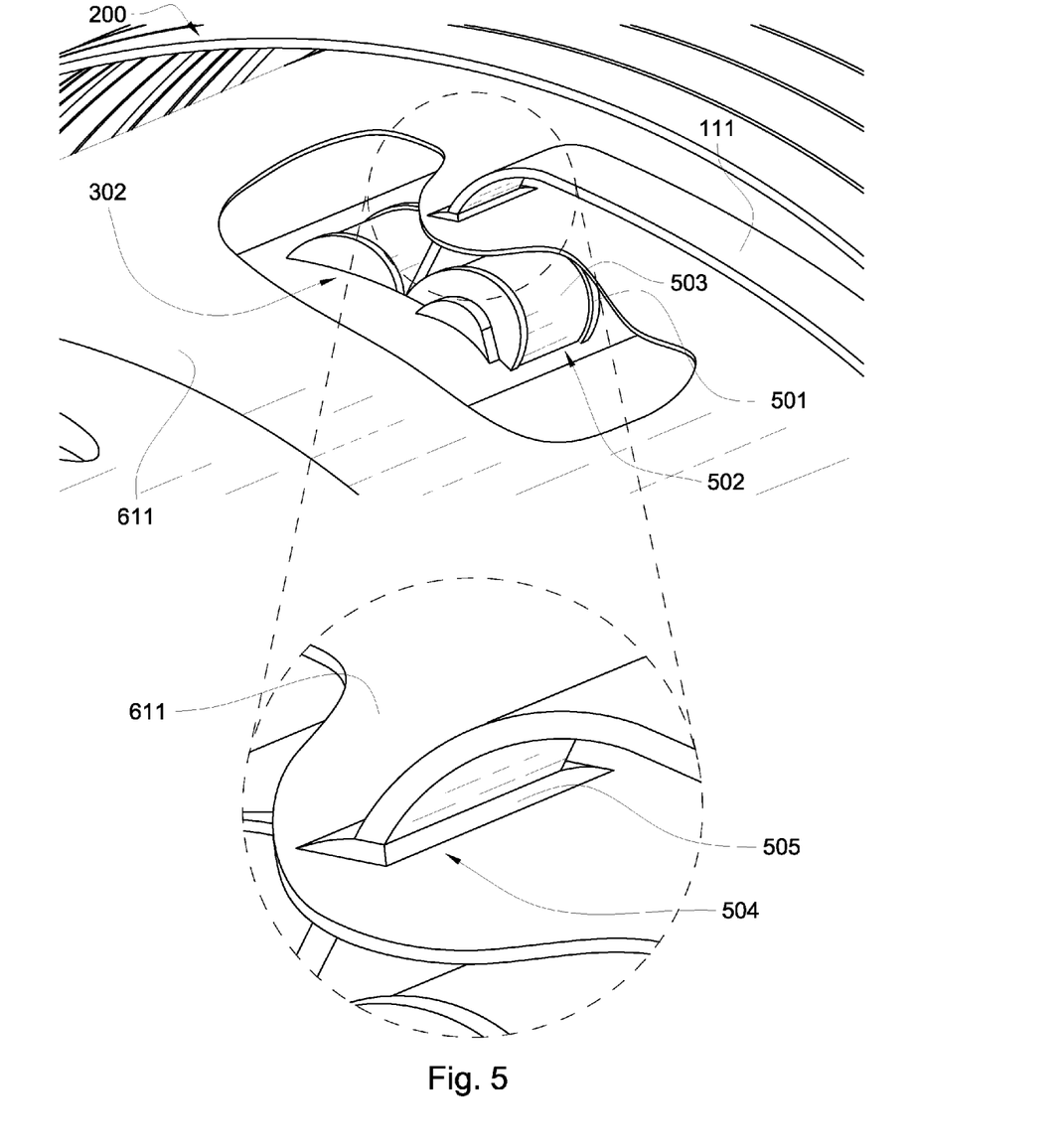
FIG. 5 is a cross-sectional diagram of an embodiment of a winding tool comprising an exit seal.

Referring now to FIG. 5, a perspective diagram discloses an exit seal 302 comprising two roller seals 501 that are revealed by a cutaway in a winding tool's sleeve 611. The roller seals 501 each comprise an elastomeric material 502 disposed along a contact surface 503. As lining material 111 leaves the winding tool 200 it passes between the two roller seals 501 and is pressed against the contact surface 503 of each roller 501, effectively creating a seal around all edges of the lining material 111. The roller seals 501 disclosed in FIG. 5 are also tension control rollers. Tension control rollers may help to force the lining material 111 outward and direct it into contact with the borehole wall 101. In some embodiments of the invention tension control rollers may be adjustable in order to vary tension on the lining material 111. After the lining material 111 passes through the exit seal 302 it passes through a peripheral exit seal 504 disposed in the winding tool's sleeve 611. Peripheral exit seal 504 may also comprise an elastomeric material 505 that may form an effective seal against each edge of the lining material 111.

Figure 6:
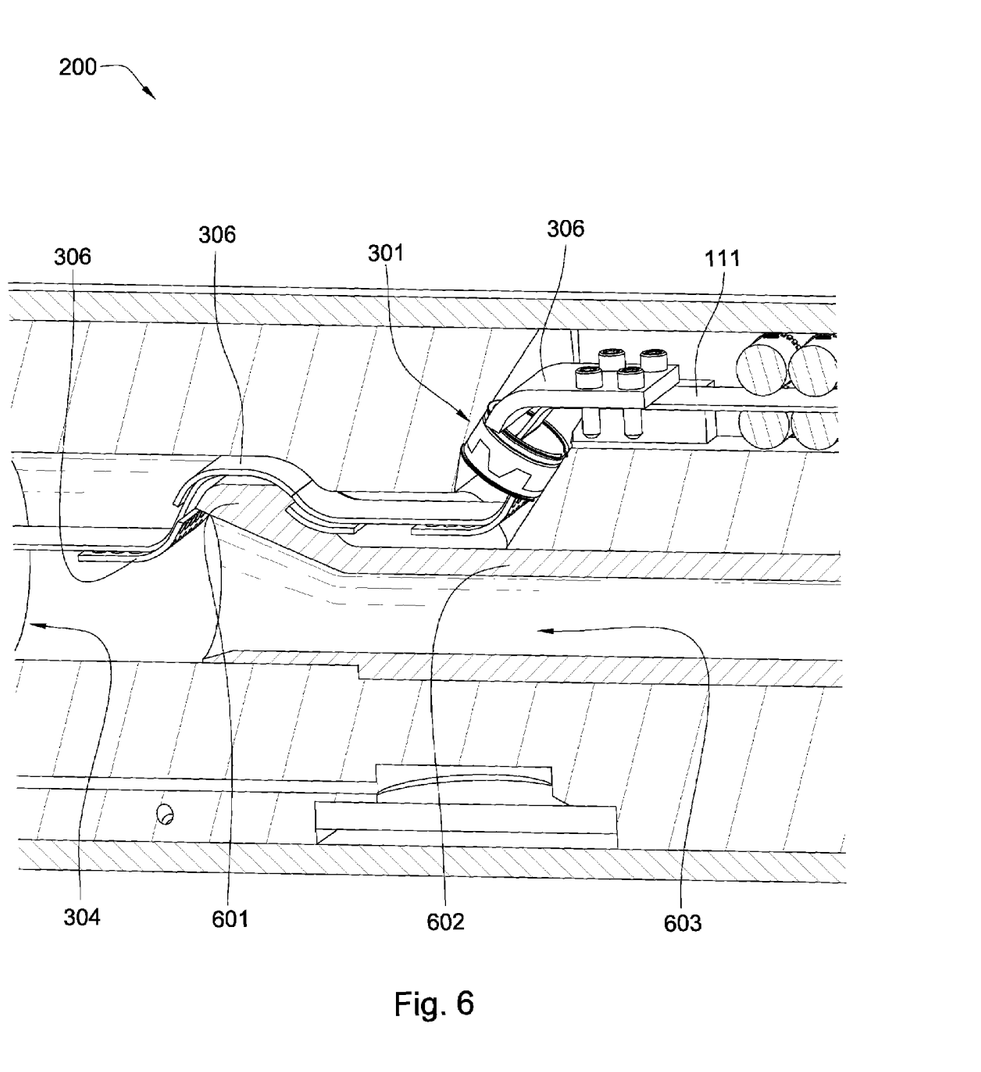
FIG. 6 is a cross-sectional diagram of another embodiment of a winding tool comprising an entry seal.

FIG. 6 discloses an embodiment of the invention in which a deflection element 601 is adapted to direct drilling mud away from the entry seal 301. The deflection element 601 in the present embodiment is part of a tubular wall 602 that forms central bore 603. Deflection element 602 is shaped so as to funnel the majority of the drilling mud flowing through central bore 304 into central bore 603. A plurality of deflection plates 306 may direct the lining material away from central bore 603 and towards entry seal 301. By increasing the percentage of drilling mud flowing through central bore 603 it is believed that the pressure on entry seal 301 may be reduced, thus increasing the life expectancy of entry seal 301.

Figure 7:
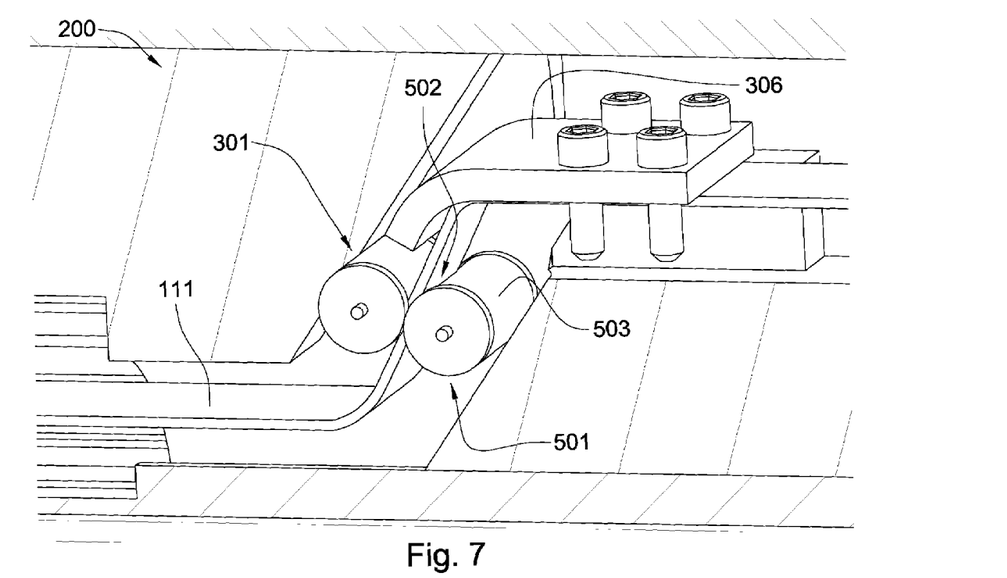
FIG. 7 is a cross-sectional diagram of another embodiment of a winding tool comprising an entry seal.

FIG. 7 discloses an embodiment of an entry seal 301 comprising a plurality of roller seals 501. Roller seals 501 may comprise an elastomeric material 502 disposed on contact surface 503. Entry seal 301 having roller seals 501 may also comprise an inner slit 402 disposed intermediate two roller seals 501.

Figure 8:
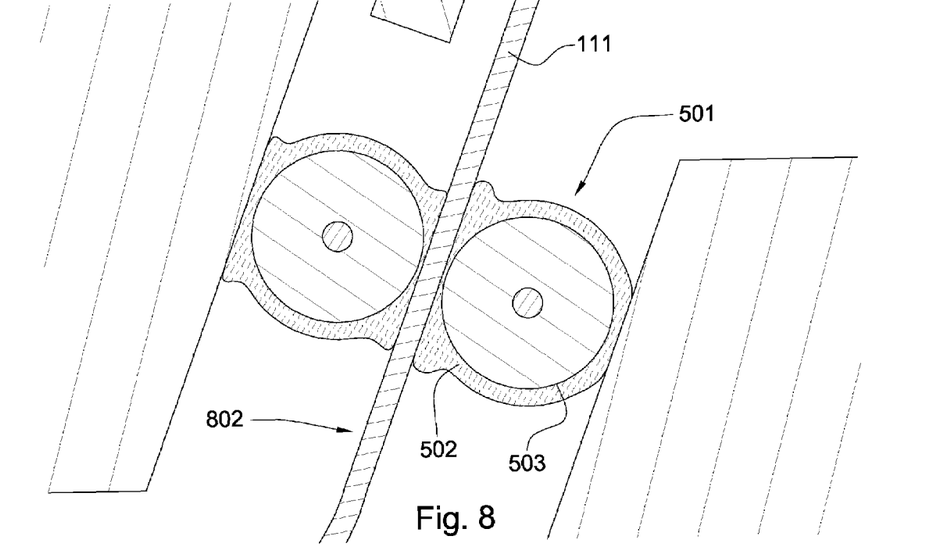
FIG. 8 is a cross-sectional diagram of an embodiment of a roller seal disposed in a winding tool.

Referring now to FIG. 8, a cross-sectional view of a plurality of roller seals 501 is disclosed forming a seal against lining material 111. Elastomeric material 502 is shown flexing to create a tight seal while allowing passage of lining material 111 through the seal 301, 302. Roller seals 501 are also shown forming a tight seal against exposed surfaces 801. The lining material 111 may be conveyed downhole in the form of a substantially flat strip 802.

Figure 9:
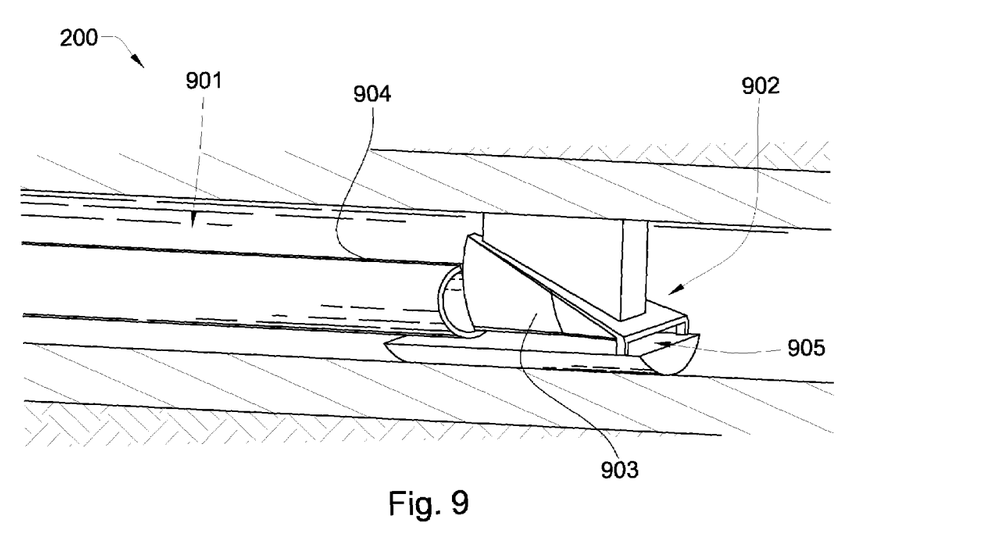
FIG. 9 is a cross-sectional diagram of an embodiment a winding tool comprising a flattening mechanism.
Figure 10:
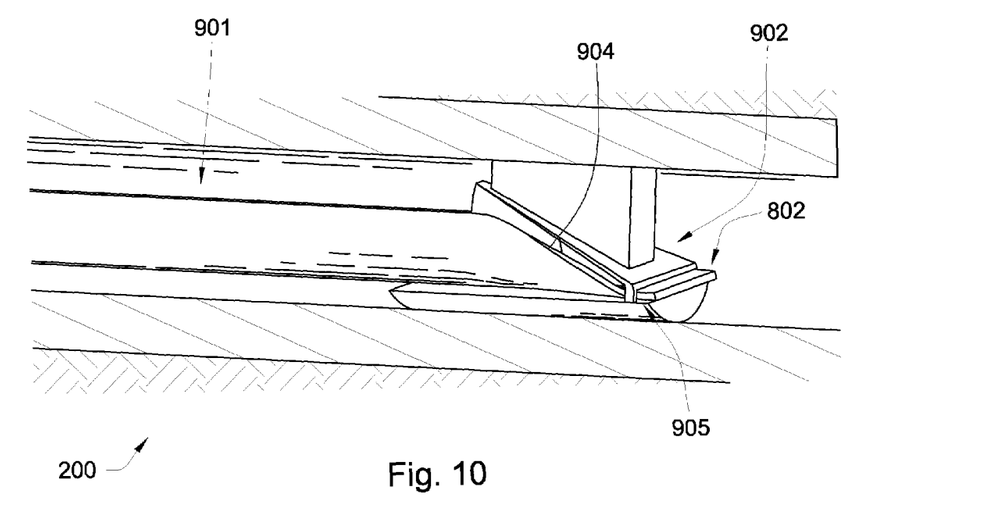
FIG. 10 is another cross-sectional diagram of an embodiment a winding tool comprising a flattening mechanism.

Referring to FIGS. 9-10, in some embodiments the lining material 111 may be conveyed downhole in the form of a split tube 901. Once downhole a flattening mechanism, such as an anvil 902, may unwrap the split tube 901 to form a generally flat strip 802. FIG. 9 shows the split tube 901 before it contacts anvil 902. Anvil 902 comprises a sloped face 903 that directs a top edge 904 of the split tube 901 away from a central axis of the tube 901 and downward. Eventually the split tube 901 may pass through an exit slot 905 that forces the lining material 111 into the shape of a generally flat strip 802. FIG. 10 shows the split tube 901 and the anvil 902 as the lining material 111 is just beginning to emerge from exit slot 905 in the shape of a generally flat strip. Other lining material geometries may be compatible with anvil 902, and other anvil geometries may also be consistent with the present invention.

Figure 11:
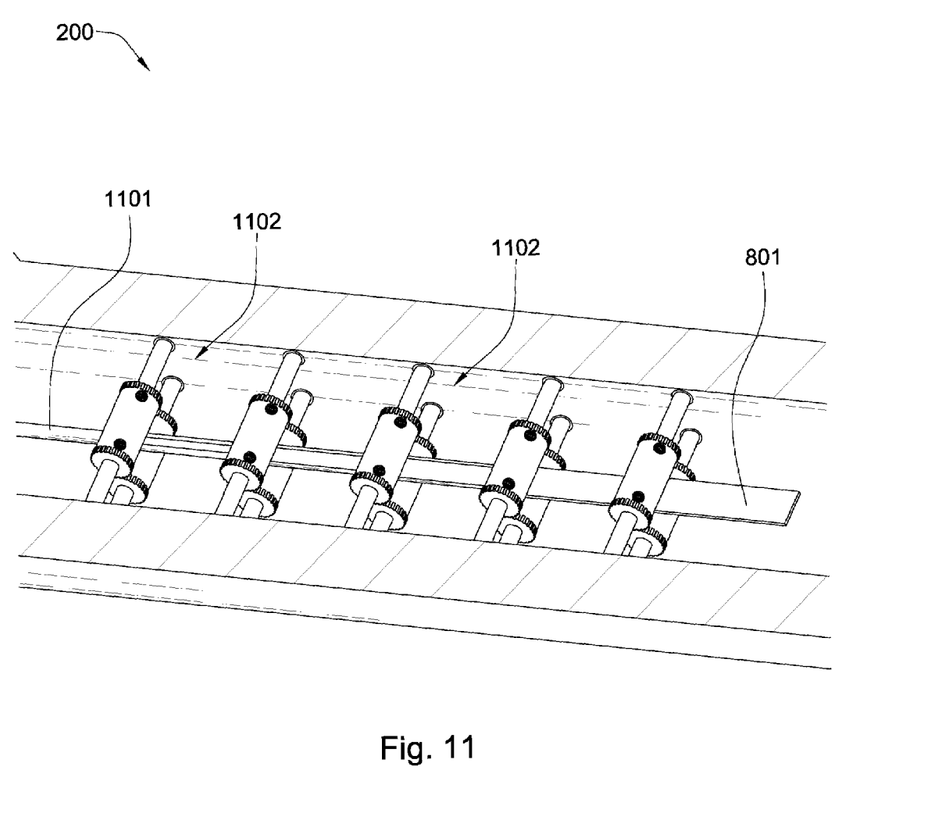
FIG. 11 is an orthogonal diagram of another embodiment of a flattening mechanism.

Referring now to FIG. 11, lining material 111 may be conveyed downhole as a solid comprising a generally cylindrical geometry. The lining material 111 may be a long, continuous cylindrical wire 1101. A flattening mechanism disposed downhole may shape or mash the wire 1101 into a generally flat strip 802. In FIG. 11 a pair of flattening rollers 1102 together form a flattening mechanism. FIG. 11 discloses the use of a plurality of flattening mechanisms downhole. In some embodiments the flattening mechanism may be disposed within the winding tool 200 or within the tool string 100. In FIG. 11 five pairs of flattening roller 1102 successively flatten the wire 1101 until the wire 1101 becomes flat strip 802. Although specific forms and combinations of flattening mechanisms have been disclosed, other flattening mechanisms may be compatible with the present invention.

Whereas the present invention has been described in particular relation to the drawings attached hereto, it should be understood that other and further modifications apart from those shown or suggested herein, may be made within the scope and spirit of the present invention.

What is claimed is:

1. A downhole winding tool adapted to dispense a lining material in a borehole, comprising:
   a lining material;
   entry and exit seals adapted to permit the movement of the lining material through the winding tool;
   wherein the entry and exit seals restrict contaminants from entering the winding tool.

2. The tool of claim 1, wherein the winding tool supports a borehole wall by directing the lining material against the wall.

3. The tool of claim 2, wherein the directed lining material forms a tubular structure that comprises a continuous length exceeding one standard drill pipe length.

4. The tool of claim 2, wherein the directed lining material forms a tubular structure that is a well-casing, a patch, a liner, or combinations thereof.

5. The tool of claim 1, wherein the lining material is selected from the group consisting of steel, 1095 steel, spring steel, a nickel alloy, plastic, polymers, composite materials and combinations thereof.

6. The tool of claim 1, wherein the lining material extends from a driving mechanism disposed proximate a surface opening of a borehole to the winding tool.

7. The tool of claim 1, wherein the winding tool comprises at least one guide block disposed within an outer diameter of a downhole tool string component.

8. The tool of claim 7, wherein the guide block comprises a lining material entry flow path and a lining material exit flow path.

9. The tool of claim 8, wherein the entry and exit flow path comprise an intersection angle of between 65 and 115 degrees.

10. The tool of claim 8, wherein the guide block comprises a flow path that rotates the lining material axially by substantially 180 degrees.

11. The tool of claim 1, wherein the winding tool comprises at least one roller, pulley, spool, deflection plate, deflection piston, motor, cam shaft, magnet, or combinations thereof.

12. The tool of claim 1, wherein at least one of the entry and exit seals is a pressure actuated seal.

13. The tool of claim 1, wherein at least one of the entry and exit seals comprises at least two roller seals.

14. The tool of claim 13, wherein the at least two roller seals comprise a deformable material disposed along a contact surface of the roller seals.

15. The tool of claim 13, wherein the at least two roller seals are tension control rollers.

16. The tool of claim 1, wherein each of the entry and exit seals comprises an inner slit through which the lining material may pass respectively into and out of the winding tool.

17. The tool of claim 16, wherein the inner slit of at least one of the entry and exit seals is adapted to close around the lining material when pressure external to the winding tool increases.

18. The tool of claim 16, wherein the winding tool comprises at least one deflection plate adapted to direct the lining material into the inner slit.

19. The tool of claim 1, wherein the winding tool comprises at least one deflection element adapted to direct drilling mud away from the entry seal.

20. The tool of claim 1, wherein the winding tool comprises a flattening mechanism adapted to form the lining material into a substantially flat strip.

* * * * *